United States Patent Office 3,310,445
Patented Mar. 21, 1967

3,310,445
APPARATUS FOR BUILDING TIRES
Takashi Nakane, Tokyo, and Takashi Kobayashi, Hiratsuka-shi, Japan, assignors to The Yokohama Rubber Company, Limited, Tokyo, Japan, a corporation of Japan
Filed June 26, 1963, Ser. No. 290,786
Claims priority, application Japan, June 28, 1962, 37/26,543
8 Claims. (Cl. 156—131)

This invention relates generally to the manufacture of tires and more particularly to methods of and apparatus for setting tire beads and finishing tires.

In manufacturing passenger car tires, which include a single bead ring, it has been common practice to fit the bead ring over a setting ring preparatory to the building operation and advance the setting ring when required during the building operation to properly fit the bead to the tire being built. Also, it has been possible to perform such fitting of bead rings to tires in an automatic fashion. The case is different with tires, as for truck use, which include two or more bead rings. In this case, it has been necessary preliminarily to fit only the first bead on a setting ring with the second bead stored in the vicinity thereof and, after the first bead ring has been fitted to the bead portion of the tire being built, to manually fit the second bead on the setting ring so that it may subsequently be set onto the bead portion of the tire.

As is well known, a finishing takes the form of a belt-like assembly comprised of commonly two or three layers of rubberized fabric bonded to each other and terminating stepwise so that no two fabric edges coincide with each other. Previously, the finishing has been bonded manually to the side of the tire on the building drum while rotating the latter at a low speed. Any automatization of this operation has been extremely difficult.

According to the present invention, it is possible to set first and second bead rings and a finishing ring in proper position on a green tire being built on a building drum without necessitating any manual operation therefor by handling the tire components solely by pneumatic or hydraulic or equivalent means. It is also possible according to the present invention to set three bead rings and a finishing ring on the bead portion of a tire automatically and accurately as required.

While the beads usable according to the present invention are substantially similar to conventional ones, the finishing layer employed in the present invention is preliminarily shaped into a ring like a cylinder packing of C section.

The foregoing and other objects, features and advantages of the present invention will become apparent from the following description when taken in conjunction with the accompanying drawings, in which.

Figure 2:
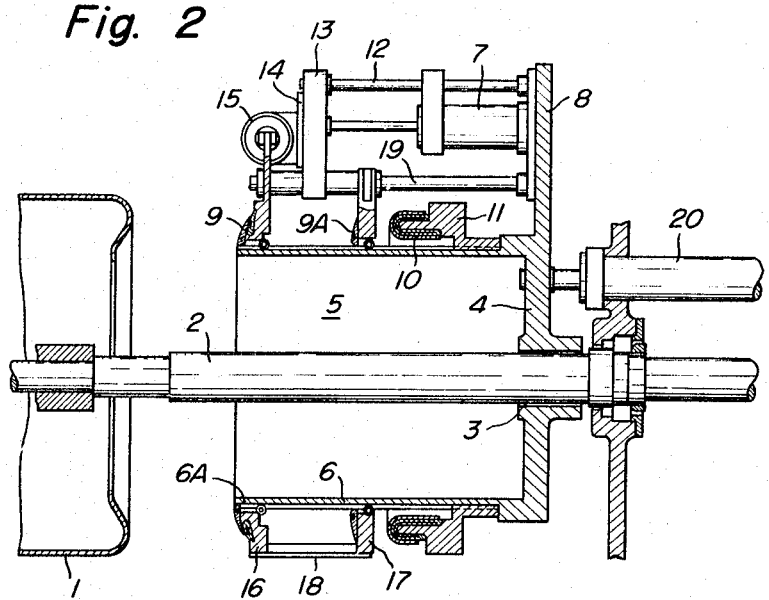
FIG. 2 is a general elevational view in section of the entire apparatus embodying the present invention showing the arrangement on either side of the building drum for inserting two beads and a finishing ring.

Referring to the drawings and first to FIG. 2, there is shown a collapsible building drum 1 mounted on a rotary shaft 2 and on which a green tire including bead rings and a finishing ring is to be built. The tire components such as bead rings and a finishing ring are to be stitched to either side of the tire being built on the drum 1.

A casing 4 is also fitted over the shaft 2 by way of a bearing 3 and encloses a space 5 accommodating a means for turning up and down the tire components over the tire being built, which means, however, is irrelevant to the present invention and will not be described in any further detail. The casing 4 includes a tubular drum portion 6 and a flange portion 8 formed to support a pneumatic or hydraulic cylinder 7, which will be described below in further detail.

Figure 1:
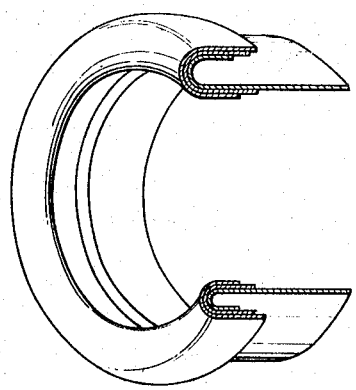
FIG. 1 is a cutaway perspective view of a shaped finishing ring usable in the present invention.
Figure 3:
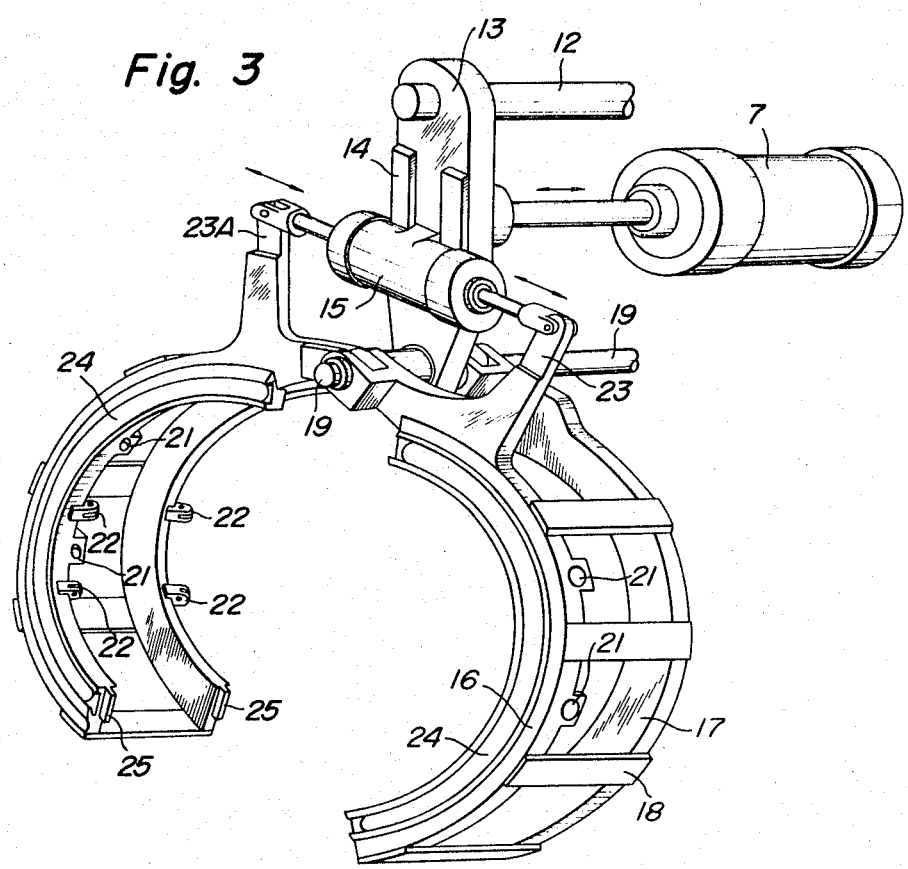
FIG. 3 is a diagrammatic perspective view of the transferring unit for delivering two beads and a finishing ring one after another.

The outer periphery of the drum portion 6 of the casing 4 is formed to fit the inner periphery of beads 9 and 9A, which are to be slid forwardly along the periphery of the drum portion 6. Also, an annular holder 11 is mounted about the drum portion 6 of the casing for holding a finishing ring 10 as shown in FIG. 1. The bead rings 9 and 9A and finishing ring 10 are moved successively to the forward end 6A of the drum portion 6 when desired to be inserted in the tire being built. To this end, a transferring unit is provided which includes a support bracket 13 loosely mounted on a guide rod 12 for back and forth movement under the control of a hydraulic assembly including cylinder 7 mounted on the casing flange 8. Mounted loosely on the bracket 13 is a pivot shaft 19 which is fixed with the flange 8 and on which a split barrel 16–17–18 is loosely mounted. Also mounted on the bracket 13 is a hydraulic assembly by way of guide formations 14 thereon, which includes a cylinder 15 and pistons mounted therein for movement toward and away from each other. The split barrel 16–17–18 includes a pair of hinged sections mounted on said pivot shaft 19 for releasably embracing the drum portion 6 of the casing 4, as shown in FIG. 3. Each of the hinged sections includes a front and a rear arcuate flange member 16 and 17 interconnected by braces 18. The hinged sections also include respective arms 23 and 23A connected at the free extremities with the pistons of the hydraulic or pneumatic assembly 15 mounted on the bracket 13. As seen in FIG. 3, upon operation of the hydraulic or pneumatic cylinder assembly 15, the hinged barrel sections are actuated to pivot about the shaft 19 between a closed and an open position about the drum portion 6. Another hydraulic or pneumatic cylinder assembly 7 is operable to move the support bracket 13 and hence the split barrel 16–17–18 back and forth. Another hydraulic or pneumatic assembly 20 (FIG. 2) is provided to move the casing 4 back and forth.

In building tires, beads 9, 9A and finishing ring 10 all initially mounted on the drum portion 6 of the casing as shown in FIG. 2 are fitted to a tire being built on the drum 1 in the following manner. Firstly, the bead 9 is transferred to the tire on the drum 1 by operating the hydraulic assembly 20 to advance the casing 4 with all components thereon until the bead 9 is pressed against the tire on the drum. The casing 4 is then retracted by the hydraulic or pneumatic assembly 20. Next, the hydraulic or pneumatic assembly 15 on the support bracket 13 is operated to open the split barrel 16–17–18 and then the hydraulic or pneumatic assembly 7 on the casing flange 8 is operated to move the opened barrel rearwardly by way of the bracket 13 until the front and rear flange members 16 and 17 are placed behind the second bead 9A and the finishing ring holder 11, respectively. The hydraulic or pneumatic assembly 15 is then operated to close the split barrel onto the periphery of the drum portion 6 of the casing 4. Subsequently, upon operation of the hydraulic or pneumatic assembly 7, the split barrel is advanced to place the second bead 9A in the position previously assumed by the first bead 9 (FIG. 2) while advancing the holder 11 with finishing ring 10 to the position previously assumed by the second bead 9A.

When the tire building operation has proceeded to the stage where the second bead 9A is to be fitted, hydraulic or pneumatic assembly 20 is again operated to advance the casing 4 until the second bead 9A is pressed against the tire being built on the drum 1. After the bead 9A has been transferred to the tire, the holder 11 is advanced from the position assumed by bead 9A in FIG. 2 to the position previously assumed by bead 9 in the same manner as described above. Subsequently, the hydraulic assembly 20 is operated to transfer the finishing ring 10 on to the tire being built on the drum 1.

Figure 4:
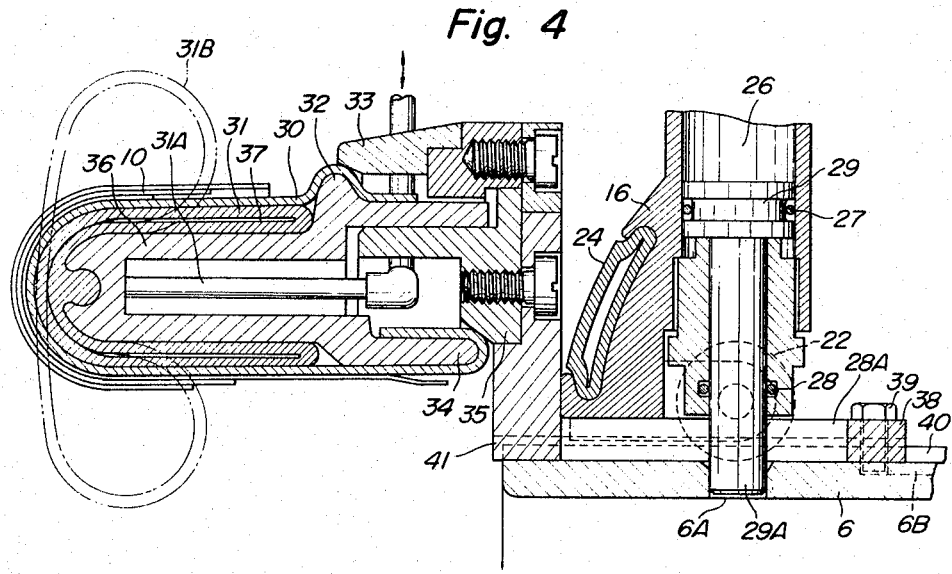
FIG. 4 is a side elevational cross section showing in detail the device for sticking a finishing ring to the green tire on the building drum and part of the transferring unit.

To describe the transferring unit in further detail, one of the hinged barrel sections has at its free extremity wedge-like formations 25 to fit in respective recesses formed in the free extremity of the other barrel section (FIG. 3) in order to ensure firm engagement between the barrel sections when the split barrel is brought into closed position about the drum portion 6 of the casing. Referring to FIGS. 3 and 4, the front flange portions 16 of the barrel sections each have an arcuate side groove for receiving a bladder 24 formed of rubber, which is inflatable and serves to press the outer marginal portion of the bead 9 against the side of the tire being built on the drum 1 when it is desired to transfer the bead from the position shown in FIG. 2 onto the tire.

Pins 21 are mounted in the hinged barrel sections (FIG. 3) for the purpose of releasably holding them in the closed position shown in FIG. 2. This is necessary to secure the split barrel and the drum portion 6 integrally with each other while a bead or finishing ring is being pressed against the tire being built. Each of the pins 21 are hydraulically or pneumatically operated. As clearly seen in FIG. 4, each of the pins includes a cylindrical body portion 29A and an integral head portion 29 which acts as a piston in one of cylinders 26 formed in the front flange portion of each of the hinged barrel sections. O-rings 27 and 28 are provided to seal the pin against the cylinder 26. As shown, the body portion 29A of the pin 21 when advanced fits in an aligned aperture 6A formed in the drum portion 6 to secure the barrel section integrally therewith.

Referring further to FIG. 4, the barrel sections each carry rollers 22 to enable the split barrel in the closed position about the drum portion to slide smoothly therealong. Also in FIG. 4, there is shown one form of the finishing ring transferring assembly or holder 11 positioned at the front end of the drum portion 6 of the casing 4. The holder 11 includes an annular support 36 carrying at its front end a rubber bladder 31 shown like a collapsed tire tube. A rubber sheet ring 30 is provided to cover and tightly embrace the bladder 31 and is clamped along the opposite edges by metallic clamping portions 32–33 and 34–35.

A conduit 31A extends into the annular support 36 for the purpose of introducing air under pressure into the space 37 in the bladder 31. By this means, the bladder 31 is inflated as indicated by the dotted lines 31B and the front end portion thereof is brought into contact with the drum 1. On this occasion, covering sheet 30 is also bulged to vertically stretch the C-sectioned finishing ring 10 fitted over the sheet 30 so that the finishing ring is pressed against the side of the tire being built on the drum 1 and thus secured to the side of the tire in proper position. Upon evacuation, the bladder 31 resiliently restores its collapsed position on the annular support 36 under the aid of the expanded rubber sheet 30.

The holder 11 also includes a guide portion 38 adapted to slide over the periphery of the drum portion 6 axially thereof and having a number of slots 28A each for receiving the body portion of pin 21 and the roller 22. A guide pin 39 is secured to the guide portion 38 to cooperate with a groove 6B formed axially in the outer periphery of the drum portion for the purpose of preventing the holder 11 from falling off the front end of the drum portion 6.

Adjuster plates 40 are provided on the periphery of the drum portion 6 and are each secured to the surface of the drum portion 6 by flat head screws. The guide portion 38 of the holder 11 is recessed like a keyway as indicated at 41 to receive the adjuster plates 40. As illustrated, the recess 41 has a substantial depth to accommodate any variation in the thickness of the adjuster plate required to suit the inner diameter of beads varying according to the tire design.

According to the present invention, it will be readily understood that tire components including three tire beads and a finishing ring may also be automatically fitted to the tire with satisfaction by replacing the barrel sections each including front and rear flange portions as shown in FIGS. 2 and 3 by those each including three flange portions.

It will also be readily understood that the hydraulic or pneumatic assemblies 7, 15 and 20 may each be replaced by thread means including a feed screw driven from a motor in both forward and reverse directions to open and close the split barrel or move it back and forth. It will be apparent to those skilled in the art that many other changes and modifications may be made without departing from the spirit and scope of the invention as claimed.

What is claimed is:

1. For use with a tire building drum, bead and finishing application apparatus comprising a supplemental drum coaxially aligned with said drum and adapted to support at least two bead elements and a finishing ring element thereon all in spaced relation relative to one another, control means to bring said bead elements individually and one at a time and then said finishing ring element sequentially to the end of the supplemental drum adjacent the tire building drum, drum displacement means to displace the supplemental drum axially towards said tire building drum, and application means to apply each element individually when it is at said end of the supplemental drum to the tire building drum.

2. Apparatus as claimed in claim 1 wherein said elements are axially spaced along said supplemental drum and said control means includes a split barrel adapted for closely encircling the supplemental drum but including hinged sections adapted to open and permit the barrel to move in back of the elements to be brought to said end, means for controllably opening and closing said sections, and means for displacing the barrel and thereby said elements axially along said supplemental drum.

3. Apparatus as claimed in claim 2 wherein said application means includes an inflatably expandible member on said barrel and adapted on inflation to displace an element which has been urged to said end by said barrel.

4. Apparatus as claimed in claim 2 wherein said barrel includes two axially spaced flanges adapted to displace two of said elements at a time.

5. Apparatus as claimed in claim 2 wherein said application means includes an axial slide on the supplemental drum and expansible means on the slide to apply said ring element to the tire building drum.

6. Apparatus as claimed in claim 5 wherein the expansible means includes an annular ring on said slide encircling said supplemental drum, a bladder on an end of said ring and flattened in U-shaped configuration against the inner and outer faces of said ring, resilient means on said ring yieldably confining the bladder in said flattened configuration and adapted to support said ring element, and means to inflate the bladder to release the ring element from the resilient means.

7. Apparatus as claimed in claim 2 comprising means for fixing said barrel to said supplement drum, the latter said means including pins and a piston and cylinder means to operate said pins.

8. Apparatus as claimed in claim 2 comprising cooperating rollers and groove means on said barrel and a supplemental drum to guide the movement of the barrel relative to said supplemental drum.

References Cited by the Examiner
UNITED STATES PATENTS

| | | | |
|---|---|---|---|
| 2,517,889 | 8/1950 | Kuffler | 156—126 |
| 2,871,912 | 2/1959 | Kraft | 156—126 |
| 3,219,510 | 11/1965 | Frazier | 156—403 |
| 3,224,921 | 12/1965 | Frazier | 156—131 |
| 3,257,255 | 6/1966 | Batten | 156—403 |

EARL M. BERGERT, *Primary Examiner.*

HAROLD ANSHER, *Examiner.*